Jan. 28, 1958      A. C. MARSHALL      2,821,360
GRUBBING ATTACHMENT FOR TRACTION VEHICLES
Filed Jan. 20, 1956      2 Sheets-Sheet 1

INVENTOR.
ASA C. MARSHALL,
BY
McMorrow, Berman & Davidson
ATTORNEYS.

Jan. 28, 1958    A. C. MARSHALL    2,821,360
GRUBBING ATTACHMENT FOR TRACTION VEHICLES
Filed Jan. 20, 1956    2 Sheets-Sheet 2

INVENTOR.
ASA C. MARSHALL,
BY
McMorrow, Berman + Davidson
ATTORNEYS.

United States Patent Office 2,821,360
Patented Jan. 28, 1958

2,821,360

GRUBBING ATTACHMENT FOR TRACTION VEHICLES

Asa C. Marshall, Willis, Va.

Application January 20, 1956, Serial No. 560,298

8 Claims. (Cl. 254—132)

This invention relates generally to grubbing or lifting attachments for traction vehicles and the like, and a primary object of invention is particularly concerned with a novel lifting attachment utilized on a traction vehicle for removing saplings, shrubs and the like, said attachment utilizing the direct application of traction force of the traction vehicle for affording a composite movement resulting in both vertical lifting of the sapling or shrub and also moving the shrub or sapling along the longitudinal path of travel of the traction vehicle.

A further object of invention in conformance with that set forth is to provide a grubbing attachment of the character set forth which includes a mounting bar secured on one side of the traction vehicle in alignment with the longitudinal axis thereof, a pair of freely pivoted lift arms secured in depending relationship from opposite end portions of said mounting bar, a lift bar pivoted at lower opposite end portions to the lift arms defining an articulated parallelogram, gripping means disposed on the lift bar in a visible position relative to an operator of the traction vehicle whereby securement of the gripping means on a vertically disposed shrub or sapling, for example, and forward movement of the traction vehicle and mounting bar therewith results in the lift arms assuming a vertical pivotal path and the lift bar moving vertically due to the articulated relationship between the lift arms, lift bar and mounting bar whereby the shrub or sapling is moved vertically and then forwardly by the traction vehicle.

A further object of invention in conformance with that set forth is to provide a grubbing attachment of the character involved which is readily and economically manufactured, easily installed and maintained, and highly serviceable, satisfactory and efficient for the purpose intended.

These together with other objects and advantages which will become subsequently apparent reside in the details of construction and operation as more fully hereinafter described and claimed, reference being had to the accompanying drawings forming a part hereof, whereby like numerals refer to like parts throughout, and in which:

Figure 1:
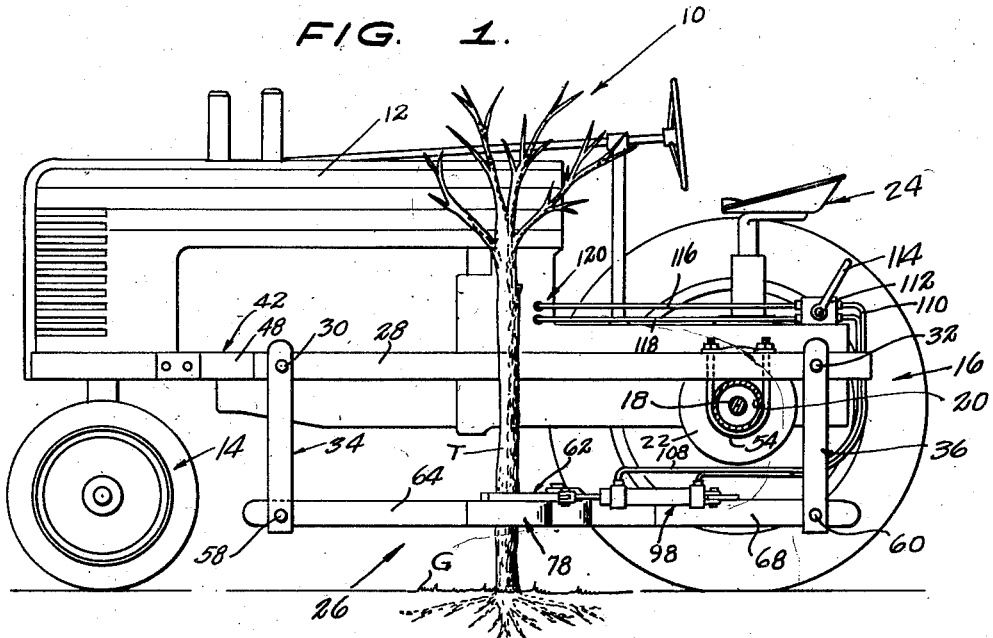
Figure 1 is a side elevational view of a traction vehicle, such as a farm tractor, with the novel grubbing attachment mounted thereon and shown positioned relative to a sapling to be removed from the ground, the rear wheel of the traction vehicle being removed and the rear axle and housing therefor being shown in section.

Referring to the drawings, indicated generally at 10 is a traction vehicle such as a farm tractor which includes a body portion 12 mounted on a suitable support chassis, said chassis having mounted thereon a front wheel assembly 14 and a rear or power wheel assembly 16 incorporating an axle 18 and an axle housing 20 which extends laterally from the differential 22 of the traction vehicle. Suitably supported on the tractor body in a rear position thereon is a conventional operator's seat assembly indicated generally at 24, said seat assembly affording the operator of the traction vehicle unobstructed visibility relative to the side portions of the traction vehicle enabling the operator of the same to have unobstructed visibility of the grubbing attachment indicated generally at 26.

The grubbing attachment 26 includes an elongated mounting bar 28 which is shown as being tubular, however a solid construction may be utilized, said bar incorporating at opposite end portions transverse aperture portions (not shown). Freely pivoted on opposite sides of the mounting bar 28 by means of transverse mounting bolts 30 and 32, for example, are forward and rear lift arms 34 and 36, respectively, which may include elongated strap elements 38 and 40 which have upper end portions suitably apertured to be received on the bolts 30 and 32, said straps 38 and 40 being disposed on opposite sides of the mounting bar 28. The lift arms 34 and 36 are freely pivoted on the mounting bar 28 for a purpose to subsequently become apparent. Also mounted on the bolt 30 adjacent an outer surface portion of the strap 38 of the arm 34, is a mounting bracket 42, which includes an intermediate web or bight portion 44 suitably apertured to be received on the bolt 30, said web portion 44 terminating in a pair of diverging legs 46 and 48 which terminate in angularly related suitably apertured mounting plates or foot portions 50 and 52, respectively. The mounting bracket 42 is mounted by means of the foot portions 50 and 52 by suitable fastening elements in laterally extending relationship from a forward side portion of the traction vehicle chassis or body.

Extending vertically through an intermediate portion of the mounting bar 28 are transverse aperture portions receiving therein opposite threaded ends of the legs of a shackle bolt 54 which is secured thereon by means of suitable nut elements 56, such shackle bolt extending around a lower outer surface portion of the axle housing 20, the lower surface portion of the mounting bar 28 resting on an upper surface portion of said axle housing whereby the mounting bar 28 is rigidly and fixedly secured to the tractor chassis or body by means of the shackle bolt 54 and the mounting bracket 42.

The straps 38 and 40 of the arms 34 and 36 include aligned transverse aperture portions receiving therethrough pivotal mounting bolts 58 and 60, respectively, which also extend through forward and rear portions of a lift bar indicated generally at 62, said lift bar may be conveniently disposed between oppositely disposed inner surface portions of the aforementioned straps 38 and 40.

Figure 2:
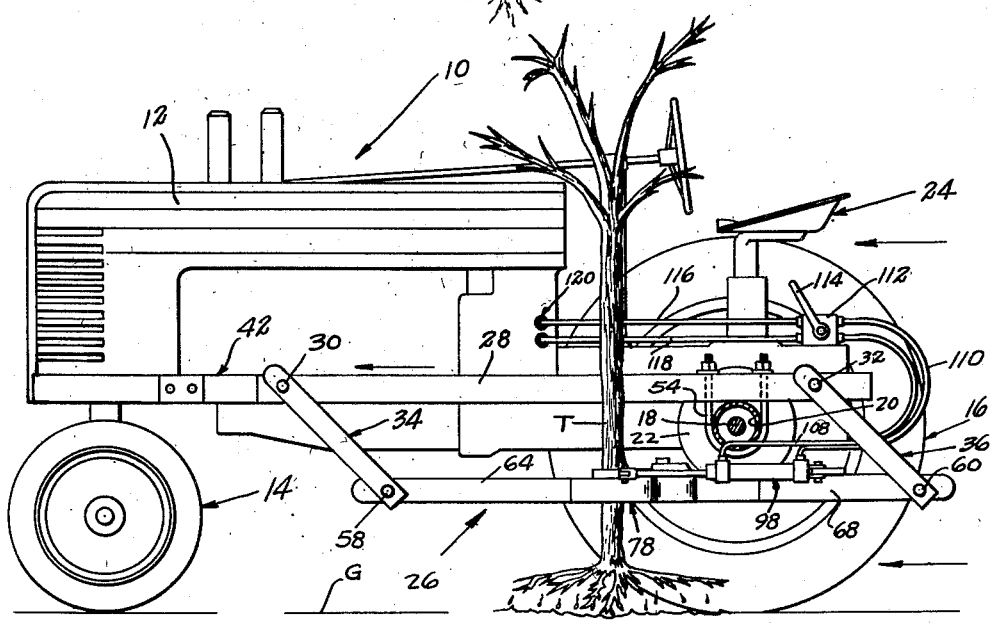
Figure 2 is a side elevational view similar to Figure 1 showing an alternate position of the grubbing attachment when the traction vehicle has been moved forward illustrating the position of the grubbing attachment resulting in the removal of the sapling from the ground.
Figure 3:
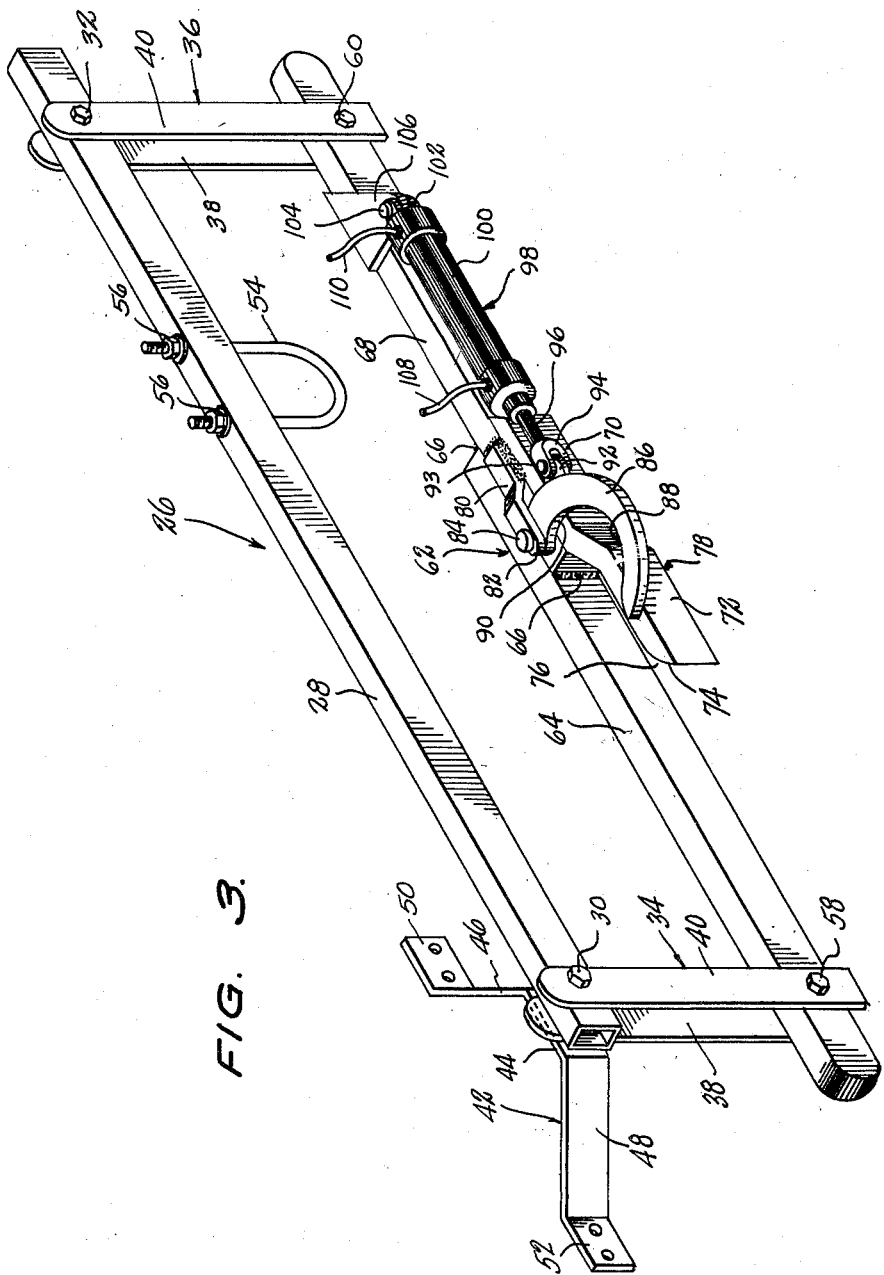
Figure 3 is an enlarged perspective view of the novel grubbing attachment removed from the traction vehicle.

The lift bar 62 includes a forward bar portion 64, see Figure 3, which has a rear surface portion fixedly secured by means of welds 66, for example, to an adjacent similar rearwardly extending bar portion 68, the bar portions 64 and 68 each of which including transverse bore portions extending therethrough which are pivotally received on the bolts 58 and 60, respectively. Suitably secured on the bar portion 68 opposite the side portion thereof which is connected to the rear of bar portion 64 is a laterally extending guide element 70, said element 70 being secured thereon in any suitable manner, by means of welding, for example, said guide element 70 including an angularly related forwardly extending guide tooth 72 having an inner arcuate surface 74 adjacent the end thereof, and defining with an oppositely disposed side surface portion of the bar 64 forwardly opening slot portion 76 for receiving therebetween the trunk T of a sapling or shrub, for example, which is to be removed from the ground G. The bar portion 64 and the guide tooth 72 constitute a forwardly opening grubbing fork which is indicated generally at 78 and which is positioned about the trunk T by means of forward movement of the traction vehicle. The grubbing fork 78, see Figures 1 and 2, is in a clearly visible position with respect to the operator's seat assembly 24 thus affording ready application of the grubbing fork on the trunk T.

Suitably secured on a forward upper surface portion of the bar portion 68 is an offset mounting bracket element 80 which includes a transverse aperture extending through the forward end portion 82 thereof, said aperture portion (not shown) being in alignment with a suitable aperture portion in the bar portion 68, the aligned aperture portions receiving therein a pivot bolt element 84 which extends through one end of an arcuate gripping jaw 86, the pivot element 84 defining a vertical pivot axis for the arcuate jaw 86 which is pivotal in a horizontal plane into intersecting or transverse relationship relative to the slot portions 76. A gripping jaw 86 may include an inner concave gripping portion 88 having a plurality of serrations 90 for affording greater gripping qualities when disposed about the tree or sapling trunk T. The gripping jaw 86 includes a rearwardly extending pivot ear element 92 integral with a rear intermediate portion thereof and pivotally receiving thereon by means of a pivot element 93 the bifurcated end 94 of a piston rod 96 of a double-acting fluid motor indicated generally at 98. The fluid motor 98 includes a cylinder 100 reciprocably supporting the piston rod 96 which is suitably secured to a piston element in the cylinder (not shown), the rear end of cylinder 100 including a bifurcated rear end portion 102 pivotally mounted by a suitable pivot element 104 to a laterally extending support ear 106 which is suitably apertured for receiving the aforementioned pivot element 104.

The cylinder 100 has suitably secured in communication with the interior thereof flexible hydraulic fluid lines 108 and 110 for directing fluid toward and away from the interior of the cylinder 100 for controlling the reciprocating movement of the piston rod 96 and thus controlling the pivotal movement of the gripping jaw 86 for urging the same into transverse gripping engagement or overlying relationship relative to the slot portion 76. The fluid lines 108 and 110 are suitably connected to a conventional control valve 112 having a handle portion 114 accessible to be controlled by the operator in the operator's seat assembly 24, and the valve 112 is connected by means of suitable hydraulic lines 116 and 118 to a portion of the traction vehicle hydraulic system indicated generally at 120.

Considering Figures 1 and 2, the traction vehicle 10 is first moved into position shown in Figure 1 with the slotted portion 76 of the grubbing fork 78 disposed about the trunk T of the sapling or tree, thereafter the gripping jaw 86 is moved into gripping relationship with said tree trunk, and forward movement of the traction vehicle 110 results in a composite movement i.e. when the traction vehicle first moves forward the mounting bar 28 will move therewith resulting in an arcuate vertical pivotal movement of the lift arms 34 and 36. This results in the vertical lifting of the lift bar 62 resulting in vertical movement of the trunk T as seen in Figure 2. After the lift bar 62 has been raised a substantial distance, continued forward movement of the traction vehicle results in lateral movement of the tree trunk T further aiding in removing the sapling or shrub which has previously been loosened in the ground by virtue of the aforementioned vertical movement.

Thus, there has been disclosed a grubbing attachment which may be utilized on traction vehicles which fully conforms with the objects of invention heretofore set forth.

Various positional directional terms such as "forward," "rear," etc., are utilized herein and have only a relative connotation to aid in describing the device and it is not intended to require any particular orientation with respect to any external elements.

The foregoing is considered illustrative only of the principles of the invention. Further, since numerous modifications and changes will readily occur to those skilled in the art, it is not desired to limit the invention to the exact construction and operation shown and described; and accordingly, all suitable modifications and equivalents may be resorted to, falling within the scope of the appended claims.

What is claimed as new is as follows:

1. A grubbing attachment for traction vehicles comprising an elongated mounting bar securable on a side portion of a tractor in alignment with the longitudinal axis thereof, a pair of pivotal lift arms pivotally connected at their upper end portions to oppositely disposed end portions of the mounting bar, an elongated lift bar pivotally connected at its opposite ends to lower end portions of the lift arms, gripping means on the lift bar for engagement with a vertically disposed member to be lifted, the mounting bar, lift arms and lift bar defining an articulated parallelogram whereby after the gripping means has been engaged with the member to be lifted, forward movement of the mounting bar results in pivotal movement of the lift arms and vertical movement of the lift bar and gripping means.

2. A grubbing attachment for traction vehicles comprising an elongated mounting bar securable on a side portion of a tractor in alignment with the longitudinal axis thereof, a pair of pivotal lift arms pivotally connected at their upper end portions to oppositely disposed end portions of the mounting bar, an elongated lift bar pivotally connected at its opposite ends to lower end portions of the lift arms, gripping means on the lift bar for engagement with a vertically disposed member to be lifted, the mounting bar, lift arms and lift bar defining an articulated parallelogram whereby after the gripping means has been engaged with the member to be lifted, forward movement of the mounting bar results in pivotal movement of the lift arms and vertical movement of the lift bar and gripping means, said gripping means comprising a horizontally disposed gripping jaw assembly carried on the lift bar.

3. A grubbing attachment for traction vehicles comprising an elongated mounting bar securable on a side portion of a tractor in alignment with the longitudinal axis thereof, a pair of pivotal lift arms pivotally connected at their upper end portions to oppositely disposed end portions of the mounting bar, an elongated lift bar pivotally connected at its opposite ends to lower end portions of the lift arms, gripping means on the lift bar for engagement with a vertically disposed member to be lifted, the mounting bar, lift arms and lift bar defining an articulated parallelogram whereby after the gripping means has been engaged with the member to be lifted, forward movement of the mounting bar results in pivotal movement of the lift arms and vertical movement of the lift bar and gripping means, said gripping means comprising a horizontally disposed gripping jaw assembly carried on the lift bar, said gripping jaw assembly comprising an elongated guide element supported in laterally extending relationship from an intermediate portion of the lift bar in spaced longitudinal alignment with the lift bar, the lift bar and guide element defining a forwardly opening slot portion, a jaw member supported on the lift bar and extendable into transverse overlying relationship relative to the open slot portion, and power means on the lift bar in engagement with the jaw member for moving the jaw member into and out of transverse overlying relationship relative to the open slot portion.

4. A grubbing attachment for traction vehicles comprising an elongated mounting bar securable on a side portion of a tractor in alignment with the longitudinal axis thereof, a pair of pivotal lift arms pivotally connected at their upper end portions to oppositely disposed end portions of the mounting bar, an elongated lift bar pivotally connected at its opposite ends to lower end portions of the lift arms, gripping means on the lift bar for engagement with a vertically disposed member to be lifted, the mounting bar, lift arms and lift bar defining an articulated parallelogram whereby after the gripping means has been engaged with the member to be lifted, forward movement of the mounting bar results in pivotal movement of the lift arms and vertical movement of the lift bar and gripping means, said gripping means comprising a horizontally disposed gripping jaw assembly carried on the lift bar, said gripping jaw assembly comprising an elongated guide element supported in laterally extending relationship from an intermediate portion of the lift bar in spaced longitudinal alignment with the lift bar, the lift bar and guide element defining a forwardly opening slot portion, a jaw member supported on the lift bar and extendable into transverse overlying relationship relative to the open slot portion, and power means on the lift bar in engagement with the jaw member for moving the jaw member into and out of transverse overlying relationship relative to the open slot portion, said jaw member being pivotally supported about a vertical pivot axis portion on the lift bar for horizontal pivotal movement thereon, said jaw member including an arcuate gripping portion having a plurality of serrated portions engageable with the member to be lifted, the power means comprising a fluid motor having a piston rod pivotally connected at an intermediate portion of the jaw member and a double-acting cylinder member reciprocably supporting the piston rod, the cylinder having an end portion pivotally connected to a support portion on the lift bar.

5. In combination with a traction vehicle having a vehicular chassis and rear elevated seat, a grubbing attachment comprising an elongated mounting bar secured on a side portion of the tractor in alignment with the longitudinal axis of said tractor, a pair of pivotal lift arms pivotally connected at upper end portions to oppositely disposed end portions of the mounting bar, an elongated lift bar pivotally connected at its opposite end portions to lower end portions of the lift arms, gripping means on the lift bar for engagement with a vertically disposed member to be lifted, the gripping means being disposed intermediate one side portion of the vehicular chassis forward of the rear elevated seat, the mounting bar, lift arms and lift bar defining an articulated parallelogram whereby after the gripping means has been engaged, forward movement of the mounting bar results in pivotal movement of the lift arms and vertical movement of the lift bar and gripping means.

6. In combination with a traction vehicle having a vehicular chassis and rear elevated seat, a grubbing attachment comprising an elongated mounting bar secured on a side portion of the tractor in alignment with the longitudinal axis of said tractor, a pair of pivotal lift arms pivotally connected at upper end portions to oppositely disposed end portions of the mounting bar, an elongated lift bar pivotally connected at its opposite end portions to lower end portions of the lift arms, gripping means on the lift bar for engagement with a vertically disposed member to be lifted, the gripping means being disposed intermediate one side portion of the vehicular chassis forward of the rear elevated seat, the mounting bar, lift arms and lift bar defining an articulated parallelogram whereby after the gripping means has been engaged, forward movement of the mounting bar results in pivotal movement of the lift arms and vertical movement of the lift bar and gripping means, said gripping means comprising a horizontally disposed gripping jaw assembly carried on the lift bar.

7. In combination with a traction vehicle having a vehicular chassis and rear elevated seat, a grubbing attachment comprising an elongated mounting bar secured on a side portion of the tractor in alignment with the longitudinal axis of said tractor, a pair of pivotal lift arms pivotally connected at upper end portions to oppositely disposed end portions of the mounting bar, an elongated lift bar pivotally connected at its opposite end portions to lower end portions of the lift arms, gripping means on the lift bar for engagement with a vertically disposed member to be lifted, the gripping means being disposed intermediate one side portion of the vehicular chassis forward of the rear elevated seat, the mounting bar, lift arms and lift bar defining an articulated parallelogram whereby after the gripping means has been engaged, forward movement of the mounting bar results in pivotal movment of the lift arms and vertical movement of the lift bar and gripping means, said gripping means comprising a horizontally disposed gripping jaw assembly carried on the lift bar, said gripping jaw assembly comprising an elongated guide element supported in laterally extending relationship from an intermediate portion of the lift bar in spaced longitudinal alignment with the lift bar, the lift bar and guide element defining a forwardly opening slot portion, a jaw member supported on the lift bar and extendable into transverse overlying relationship relative to the open slot portion, and power means on the lift bar in engagement with the jaw member for moving the jaw member into and out of transverse overlying relationship relative to the open slot portion.

8. In combination with a traction vehicle having a vehicular chassis and rear elevated seat, a grubbing attachment comprising an elongated mounting bar secured on a side portion of the tractor in alignment with the longitudinal axis of said tractor, a pair of pivotal lift arms pivotally connected at upper end portions to oppositely disposed end portions of the mounting bar, an elongated lift bar pivotally connected at its opposite end portions to lower end portions of the lift arms, gripping means on the lift bar for engagement with a vertically disposed member to be lifted, the gripping means being disposed intermediate one side portion of the vehicular chassis forward of the rear elevated seat, the mounting bar, lift arms and lift bar defining an articulated parallelogram whereby after the gripping means has been engaged, forward movement of the mounting bar results in pivotal movement of the lift arms and vertical movement of the lift bar and gripping means, said gripping means comprising a horizontally disposed gripping jaw assembly carried on the lift bar, said gripping jaw assembly comprising an elongated guide element supported in laterally extending relationship from an intermediate portion of the lift bar in spaced longitudinal alignment with the lift bar, the lift bar and guide element defining a forwardly opening slot portion, a jaw member supported on the lift bar and extendable into transverse overlying relationship relative to the open slot portion, and power means on the lift bar in engagement with the jaw member for moving the jaw member into and out of transverse overlying relationship relative to the open slot portion, said jaw member being pivotally supported about a vertical pivot axis portion on the lift bar for horizontal pivotal movement thereon, said jaw member including an arcuate gripping portion having a plurality of serrated portions engageable with the member to be lifted, the power means comprising a fluid motor having a piston rod pivotally connected at an intermediate portion of the jaw member and a double-acting cylinder member reciprocably supporting the piston rod, the cylinder having an end portion pivotally connected to a support portion on the lift bar.

References Cited in the file of this patent

UNITED STATES PATENTS

| 76,497 | Moore | Apr. 7, 1868 |
| 2,747,305 | Marshall | May 29, 1956 |